Patented July 16, 1929.

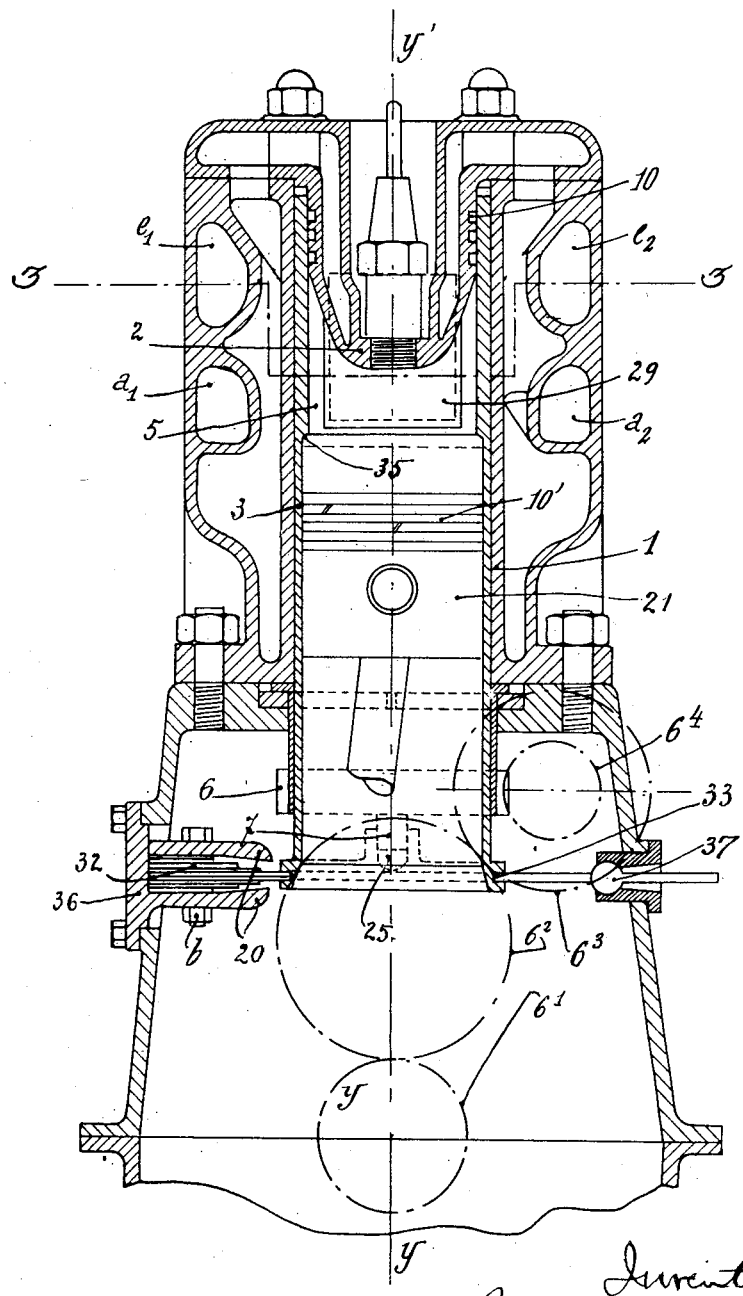

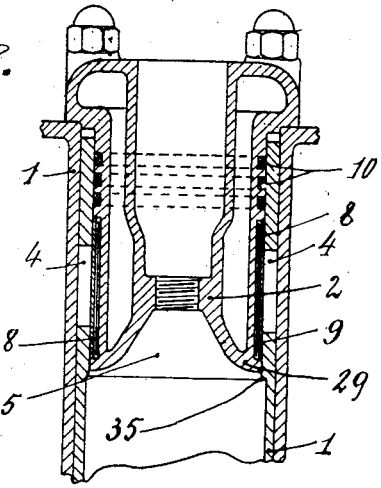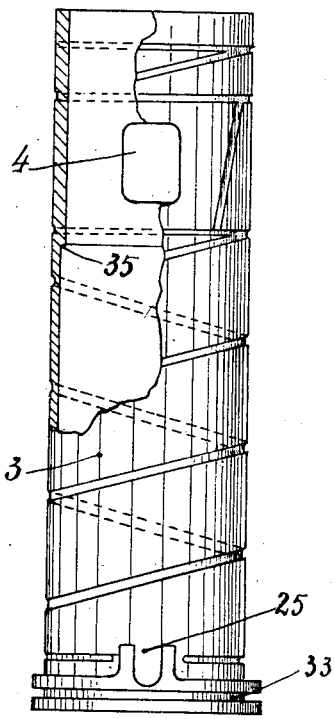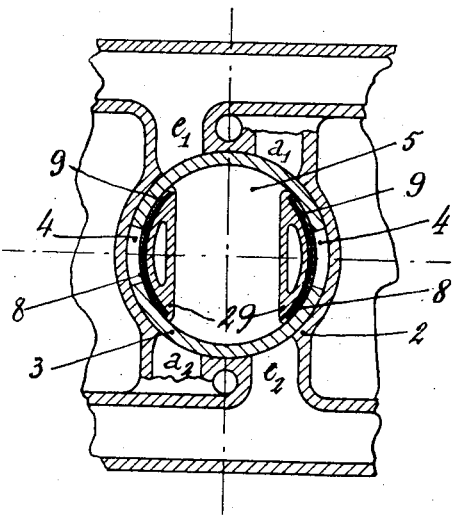

1,721,457

UNITED STATES PATENT OFFICE.

ROGER PIERRE FÉLIX LEMASSON AND EDOUARD HUBERT MARTIN, OF PARIS, FRANCE.

VALVE GEAR FOR PISTON ENGINES.

Application filed August 10, 1925, Serial No. 49,406, and in Belgium August 22, 1924.

The present invention has for its object a valve system comprising a cylindrical sleeve which is applicable to all machines such as driving or actuated apparatus, and is more particularly applicable to internal combustion engines.

Our said valve sleeve arrangement is characterized in that it has two distinct and concurrent movements, one being a continuous rotary motion for controlling the gas and the other a rectilinear reciprocating motion having a relatively small amplitude, and preferably variable, whose object is to assure the lubrication, the grinding, and the fluidtight working of the valve gear.

The said device may be combined to advantage with a special cylinder head or end piece, disposed within the valve sleeve in the case in which the latter is concentric with the axis of the engine piston; said cylinder head carrying suitable packing elements as well as two extensions provided with closing plates which are pressed by expanding springs against the internal wall of the said valve sleeve.

As will be understood, the said rotary valve gear may consist of a cylindrical sleeve disposed either at the exterior or in the interior of the engine cylinder, and it may occupy the concentric, parallel or perpendicular position relatively to the engine cylinder, or may even be inclined from this latter. It may be even made double, as two concentric sleeves rotating in inverse directions in order to augment the speed of opening and closing the gas orifices.

The control of the continuous movement of rotation may be effected by any suitable connecting arrangement, for example by a set of gear wheels, and operating at a suitable speed, this being one-quarter of the speed of the engine shaft in the case of a four stroke system and when the sleeve carries two ports. The said control should be effected in such manner as to provide for the reciprocating motion of the sleeve at the same time as the movement of rotation.

The alternating motion of small amplitude is produced on the pneumatic principle, by utilizing the variations of pressure of gases or fluids, elastic or incompressible, in the cylinder during the several stages of the cycle.

The various means for the control of the cylindrical valve arrangement or cylinder, for the obtainment of the alternating motion of small amplitude combined with its movement of rotation, are clearly set forth in the following description with reference to the appended drawings.

Fig. 1 is a vertical section of an internal combustion engine constituting a preferred embodiment of the invention.

Fig. 2 is a vertical longitudinal section of the upper portion of the same.

Fig. 3 is a horizontal section on the line 3—3 of Fig. 1.

Fig. 4 is a side elevation, partly in section, of the valve sleeve.

In the form of construction shown, the revoluble valve 3 consists of a cylindrical sleeve which is given simultaneously a continuous movement of rotation about the axis $y\ y'$ and a rectilinear reciprocating motion parallel with the said axis between the power cylinder 1 provided with the inlet orifices $a^1$ and $a^2$ and the exhaust orifices $e^1$ and $e^2$ and the cylinder head 2.

The valve sleeve 3 has two orifices or ports 4 in the diametrically opposite position, and the said valve sleeve is rotated at a suitable speed, or at one-fourth the speed of the driving shaft, in the case of a four-stroke engine. The said ports connect at the proper time the ports $a^1$ and $a^2$ and then $e^1$ and $e^2$ with the combustion chamber 5, thus determining the phases of the admission and the exhaust.

The said valve is actuated in its rotary movement by a set of gear wheels, as shown in Fig. 1. A worm wheel 6 surrounding the sleeve is provided with an entraining tooth 7 which is movable in a slot formed at the lower part of the said sleeve.

During the compression and expansion strokes, as shown in Fig. 3, the gas which is compressed in the combustion chamber 5 will seek an exit between the cylinder head 2 and the valve 3, due to the play required for the expansion and the operation of the said valve. In order to obviate all such leakage, the said valve, in addition to its continuous rotary motion, is given a reciprocating motion of small amplitude, parallel to the said axis.

The cylinder head 2 has a special shape which is shown in Figs. 1, 2 and 3. It is provided with the closing elements 8 having the form of portions of cylindrical rings whose height is somewhat greater than that of the ports, to which is to be added the amplitude of the reciprocating motion of the said valve. The said closing elements are mounted upon two extensions 29 of the cylinder head 2 (see Fig. 2).

Below the said closing elements are disposed the plate springs 9 serving to press the said elements against the inner wall of the valve 3. The cylinder head 2 is further provided with suitable packing members 10 analogous to those of the piston. The valve 3 in its reciprocating motion analogous to that of the piston—but of small amplitude—tends to draw with it the packing members 10, and thus presses them against the edges of their grooves in the same manner as for the packing members of the piston.

The lubrication of the valve sleeve is effected, for example, by the projection of oil from the engine shaft and the piston rod upon the lower part of the valve sleeve, and from this point the oil rises to the upper part through a helical groove which is suitably formed upon the external wall of the valve sleeve, the direction of the helix being such that the rotation of the sleeve will draw this oil from the lower part to the upper part.

The construction shown, also permits the obtainment of a reciprocating motion of the valve sleeve which is variable and independent of the rotary motion of the valve sleeve, by a pneumatic and automatic drive. The valve sleeve is given its rotary motion through the intermediary of the gear wheels $6^1\ 6^2\ 6^3\ 6^4$; the latter wheel engages a ring with helical teeth 6 surrounding the valve sleeve and secured to the latter by an entraining tooth 7 engaged in a recess 25 provided at the lower part of said sleeve, and this has for effect to protect the sleeve from the reactions of the gearing controlling the said sleeve, while allowing it to effect its reciprocating motion of small and variable amplitude.

This reciprocating motion of the valve sleeve is obtained in the following manner:

The said sleeve, at its upper part where the ports are situated, has a bore which is smaller than that of its lower part in which the piston moves, so that the variable pressure prevailing in the combustion chamber will be exercised upon the step or shoulder 35. The surface of the step or shoulder is so calculated that the pressure of the explosion upon the step will be sufficient to overcome the friction of the sleeve on the cylinder, as well as the friction resulting from the pressure of the closing plates 8 and the packing members 10 upon the sleeve. The valve sleeve is thus subjected according to its axis $y\ y'$ to a variable differential pressure which depends upon the surface of the step. In this manner, it is a physical—and automatic—action which produces the reciprocating motion, it being made variable by the effect of the plate spring 32 which is antagonistic as well as damping, which is secured to the sleeve through the medium of the groove 33 provided at the bottom of the sleeve and in which the main plates are engaged; said spring serves in fact to bring back the sleeve due to its tension concurrently with the admission vacuum acting upon the step 35, during the inlet and exhaust strokes, but without interfering with its rotation. Its power will depend upon the surface of the step, and its flexibility is so calculated that there will be a constant relation between the relative displacement of the valve sleeve and that of the piston, the stopping (even momentary) of this motion having as its immediate consequence a leakage of gas which is prejudicial to the proper working of the engine.

The damping spring 32 consists of strips of different lengths which are assembled and held by the bolts $b$ in the support 36, whose inclined internal faces end in the two pointed parts 20. The valve sleeve being subjected, in its reciprocating motion of small amplitude, to forces of inertia which vary according to the rate of functioning of the engine, the plate spring 32 will be subjected to variable tensions and flexions which will diminish or amplify the reciprocating motion of the sleeve. As will be readily understood, the two ends 20 of the support 36, which diminish or augment the length of the spring according as certain plates, during the movement of the valve sleeve, enter into contact with said support, will thus automatically limit the amplitude of the rectilinear oscillations of the sleeve; this will in fact produce automatically a variation in the flexibility of the spring due to the variation in the length of the lever arm of the spring.

As above set forth, the reciprocating motion of the sleeve being entirely pneumatic and automatic, and quite distinct from the rotary motion due to the absence of all mechanical connection between the said movements, it will follow that the least defect in the functioning of the sleeve will be shown by the immediate cessation (or even an irregularity) of the reciprocating motion of the sleeve, this being a reliable warning of future damage.

To take account of the same in a ready manner, an oscillating indicating arm 37 whereof one end is engaged in the groove 33 of the sleeve and the other end extends outwardly of the cylinder, shows in a permanent and instantaneous manner the reciprocating action of the sleeve, and indicates that the engine is to be stopped in the event of abnormal working.

This method for the observation of the proper reciprocating action of the sleeve by an indicating device may be replaced by any suitable mechanical or electrical device, with direct or indirect vision, and it obviously presents a capital interest for aviation engines. It is evident that this method of observation is applicable to the constructional forms hereinbefore set forth.

The variable reciprocating motion of the valve sleeve, which assures the functioning and the lubrication of the packing elements of the cylinder head and the closing devices, will have as a direct consequence the fluidtight condition of the combustion chamber, and its small amplitude, which is sufficient for the proper working, will also further the obtainment of high speeds of rotation, the alternating forces of inertia of the sleeve being practically nil.

In fact, the stages of the valve operation are produced solely by the rotary motion of the said sleeve, on the contrary to what occurs in certain valveless engines comprising sleeves with reciprocating motion, or sleeves having an alternating rotary motion as well as a rectilinear reciprocating motion on the axis of the sleeve, wherein the stages of the valve action are due to the said reciprocating motion or to the alternating rotary motion. In such valve gear, the amplitude of said motion will depend upon the height of the ports, which must be increase in order to attain high speeds of rotation (since it is impossible to increase them in a circular manner), and which, according as it increases, will proportionally augment the alternating forces of inertia which automatically limit the maximum speed of the engine.

The system of valve gear according to the present invention, which comprises two movements which are quite separate and distinct, one being circular and continuous, for the gas control, and the other alternating and rectilinear, of small amplitude, to assure at the same time the lubrication and grinding of the valve element and its fluidtight working, will entirely obviate the defective conditions above set forth.

The use of our said system may be extended to all engines employing two, four, six or more strokes per cycle and operating by internal combustion, or by steam, compressed air, or hydraulic means, as well as to pumps, air compressors or like devices.

Obviously, our said system is susceptible of various modifications without departing from the spirit of the present invention.

What we claim is:

1. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gasses in the cylinder during the stages of the cycle.

2. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle and means for damping the said rectilinear alternating motion of said sleeve.

3. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle and means for giving an indication of said rectilinear alternating motion of said sleeve on the outside of said engine.

4. In a valve arrangement for internal combustion engines having a cylindrical sleeve surrounding the piston and means for giving to said sleeve a continuous rotation about its axis, a shoulder formed in the internal wall of said sleeve, whereby a rectilinear alterating motion of the said sleeve of small amplitude is obtained automatically on the pneumatic principle by utilizing the variations in the pressure of gases in the cylinder during the stages of the cycle, means for damping the said rectilinear alternating motion of said sleeve, and means for giving an indication of said rectilinear alternating motion of said sleeve on the outside of said engine.

5. In a valve arrangement for internal combustion engines having a cylindrical sleeve surrounding the piston and means for giving to said sleeve a continuous rotation about its axis, a shoulder formed in the internal wall of said sleeve, whereby a rectilinear alterating motion of the said sleeve of small amplitude is obtained automatically on the pneumatic principle by utilizing the variations in the pressure of gases in the cylinder during the stages of the cycle, and a plurality of leaf springs disposed in laminations of different lengths cooperating with said sleeve adapted to progressively damp the rectilinear alternating motion thereof.

6. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle, a groove formed on the lower end of said sleeve and an oscillatively mounted indicating arm visible from the outside of said engine extending into said groove.

7. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle, a plurality of leaf springs disposed in laminations of different lengths cooperating with said sleeve adapted to progressively damp the rectilinear alternating motion thereof, a groove formed on the lower end of said sleeve and an oscillatively mounted indicating arm visible from the outside of said engine extending into said groove.

8. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle, a groove formed in the lower end of said sleeve, a fixed leaf spring extending into said groove, a plurality of leaf springs of different lengths disposed above and below said first mentioned spring, and a fixed cam surface cooperating with each of said last mentioned sets of springs adapted to come successively into contact therewith for progressively damping the rectilinear motion of said sleeve.

9. In a valve arrangement for internal combustion engines having a cylindrical sleeve surrounding the piston and means for giving to said sleeve a continuous rotation about its axis, a shoulder formed in the internal wall of said sleeve, whereby a rectilinear alternating motion of the said sleeve of small amplitude is obtained automatically on the pneumatic principle by utilizing the variations in the pressure of gases in the cylinder during the stages of the cycle, a groove formed in the lower end of said sleeve, a fixed leaf spring extending into said groove, a plurality of leaf springs of different length disposed above and below said first mentioned spring, a fixed cam surface cooperating with each of said last mentioned sets of springs adapted to come successively into contact therewith for progressively damping the rectilinear motion of said sleeve and an oscillatively mounted indicating arm visible from the outside of said engine extending into said groove.

In testimony whereof we have signed this specification.

ROGER PIERRE FÉLIX LEMASSON.
EDOUARD HUBERT MARTIN.